United States Patent [19]
Esmond

[11] 3,827,562
[45] Aug. 6, 1974

[54] FILTERING DEVICE

[76] Inventor: William G. Esmond, 537 Stamford Rd., Baltimore, Md. 21229

[22] Filed: Dec. 6, 1972

[21] Appl. No.: 312,487

Related U.S. Application Data

[63] Continuation-in-part of Ser. No. 231,691, March 3, 1972, Pat. No. 3,795,088.

[52] U.S. Cl................ 210/304, 210/321, 210/494
[51] Int. Cl.............................................. B01d 31/00
[58] Field of Search ........... 210/304, 321, 494, 493; 23/258.5

[56] References Cited
UNITED STATES PATENTS

| | | | |
|---|---|---|---|
| 1,872,430 | 8/1932 | Ericson | 210/494 |
| 2,110,009 | 3/1938 | Weidenbacker | 210/494 X |
| 2,337,579 | 12/1943 | Walker et al. | 210/487 X |
| 2,833,279 | 5/1958 | Gollan | 23/258.5 |
| 3,015,331 | 2/1962 | Warrick | 23/258.5 |
| 3,668,837 | 6/1972 | Gross | 210/321 |

*Primary Examiner*—Frank A. Spear, Jr.
*Attorney, Agent, or Firm*—Charles R. Allen; Charles Brown

[57] ABSTRACT

This disclosure relates to a device for the removal of gases, particulate matter and oil primarily from blood after the treatment thereof in an artificial body device. The filter device utilizes a plurality of filter cloth layers disposed generally parallel to the path of blood flow and being supported in spaced relation and against collapse by a relatively coarse mesh arranged in layers and disposed between adjacent filter cloth layers. The device operates primarily on the principal of laminar flow of the blood through the filter cloth layers with the filter cloth being formed of a material having an affinity for the blood whereby gases or bubbles entrapped therein will be caused to be released.

12 Claims, 10 Drawing Figures

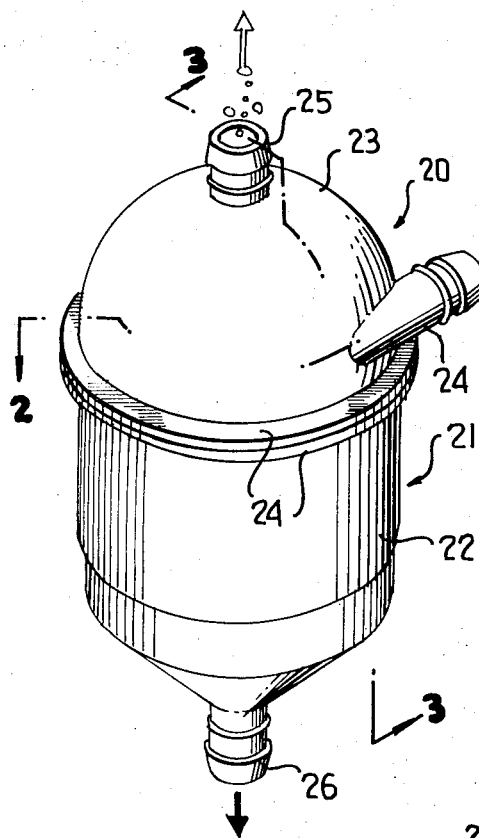
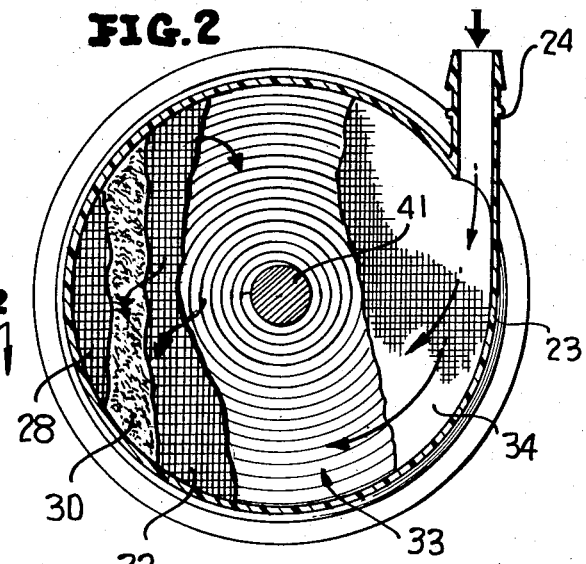
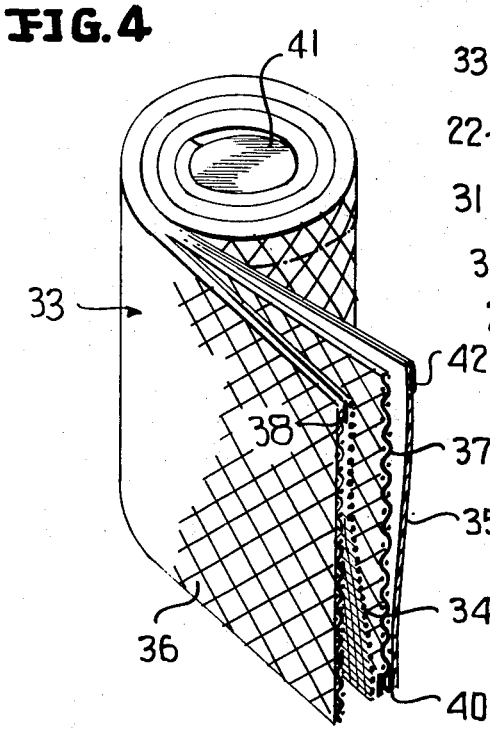
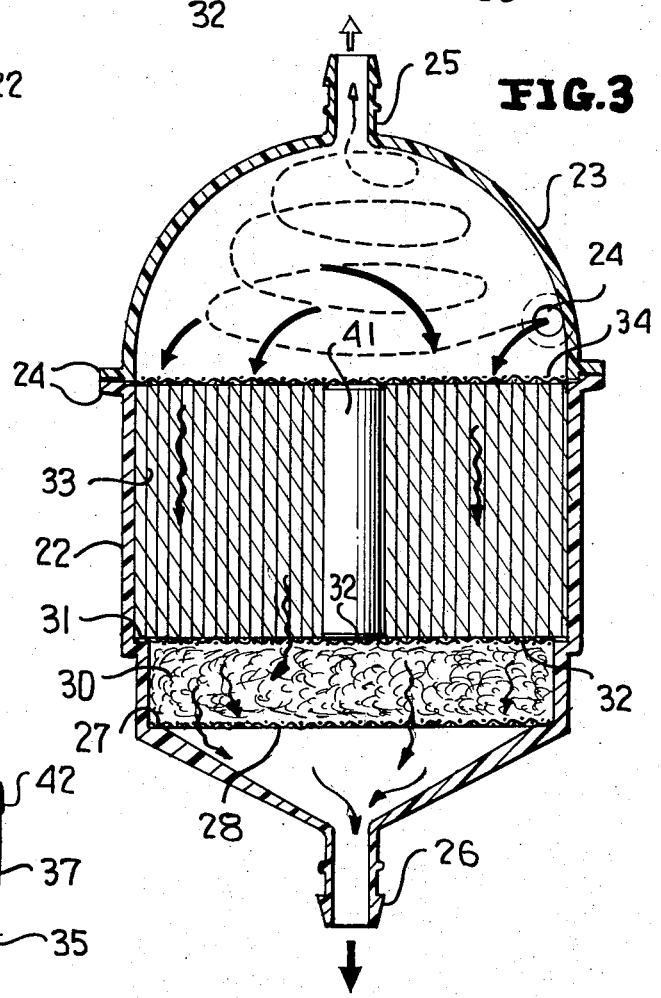

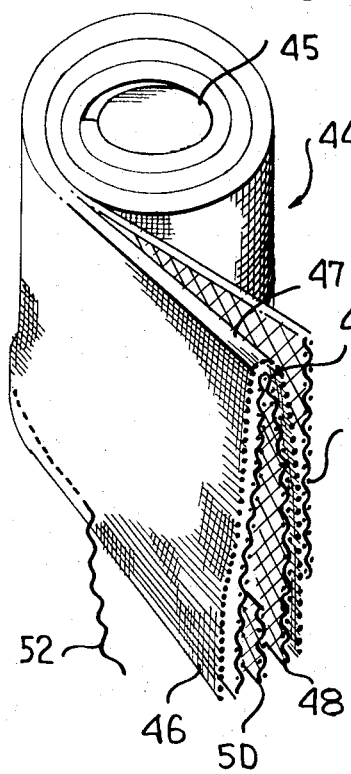
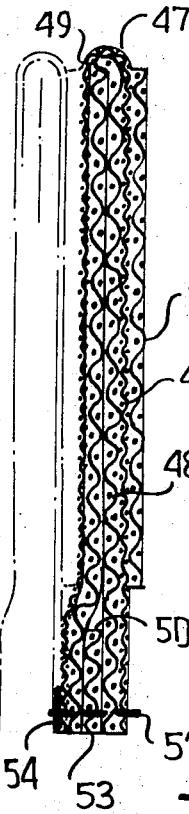
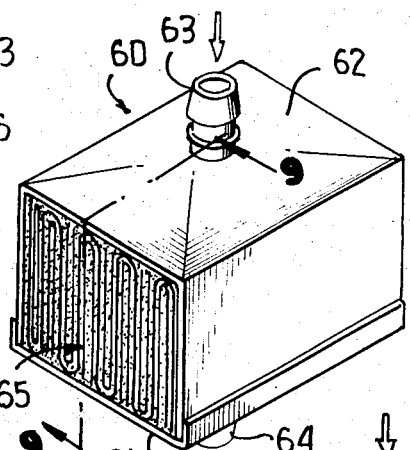
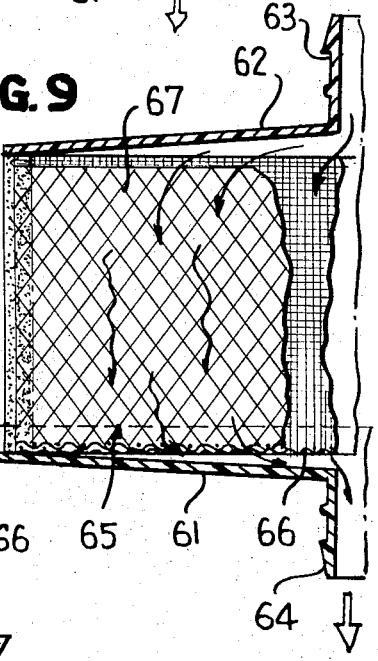
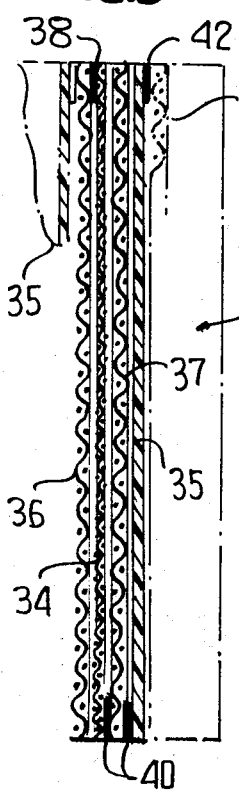
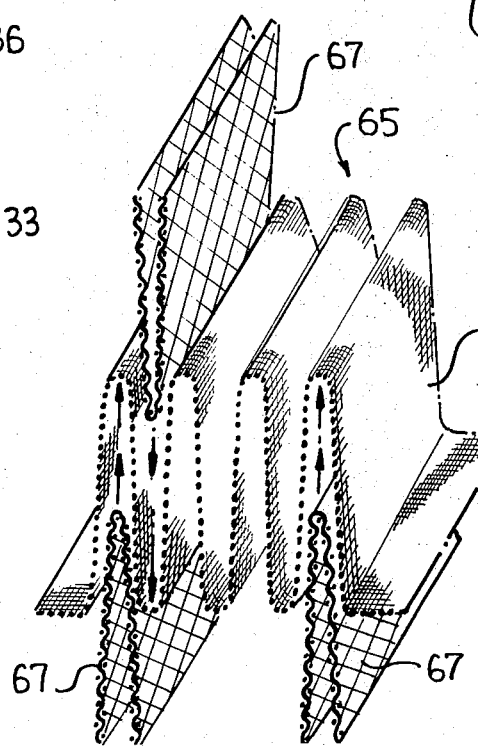

FILTERING DEVICE

This application is an improvement and continuation-in-part of my copending application Ser. No. 231,691, entitled Degassing, Particulate Matter and Oil Filter Device, filed Mar. 3, 1972, now U.S. Pat. No. 3,795,088.

This invention relates in general to new and useful improvements in degassing and filtering devices, and more particularly to a filter device for use in treating human blood.

BACKGROUND OF THE INVENTION

In the treatment of human blood by the passage thereof through an artificial body member, such as an artificial lung, there is a tendency for bubbles of air of oxygen to exist within the blood. Also, particulate matter, such as platelet clumps, white cells and fibrinous debris occur in the blood together with organic oil droplets as may be formed from the lipid components of the blood itself or silicon oil droplets that originate from the use of bubble oxygenators which must employ silicon oil defoaming agents which are swept into the blood.

SUMMARY OF THE INVENTION

In view of the foregoing, it is proposed to provide a filtering device through which human blood, after being initially treated, outside of the body, is passed with the flow of the blood through the device being sufficiently gentle so as to in no way harm the blood, but at the same time the flow being one wherein gases, particulate matter and oil which may possibly exist in the blood are removed.

In order to accomplish the removal of the foreign matter from the blood, a simple filter element is provided. The filter element includes a plurality of filter cloth layers which are disposed generally parallel to the direction of blood flow through the filtering device with the filter cloth layers being supported and spaced apart by coarse mesh layers spaced therebetween and secured thereto as a reinforcement.

In the preferred embodiment of the invention, several elongated strips of filter cloth material are bonded to coarse mesh strips in alternating relation and thereafter the bonded together strips are spirally wound to form a filter element. The connections between adjacent filter cloth layers are of a nature wherein all blood passing through the filter element must pass through one layer of the filter cloth.

In order that the blood may be uniformly distributed to such a spiral wound filter element, it is preferable that the filter element be mounted within a housing having an upper portion into which blood is freely flowing with the blood being directed into such upper portion in a spiral manner so as to effect a uniform distribution. This spiral flow of the blood in the upper portion of the filter also provides the blood with a greater opportunity to release gas bubbles entrapped therein.

Such a filter may also include a second and final filtering material disposed below the filter element with this second and final filter element being formed of fine monofilament fluff or silicon open cell sponge.

The filter element may take a further form in that the filter cloth material, while still provided as an elongated strip and spirally wound, may be folded longitudinally upon itself and thereafter having the coarse mesh material associated therewith before it is spirally wound. Further, it may be desirable to vary the thickness of the coarse mesh material between adjacent filter cloth layers with the coarse mesh material being disposed in offset relation so as to provide for a sloping surface on the filter cloth material.

In another form of the invention, the filter element may be formed by pleating the filter cloth and then disposing between adjacent layers the coarse mesh supporting material. Also, the coarse mesh supporting material may be in the form of strips reversely folded and internested with the filter cloth so that the filter cloth may be disposed substantially vertically with the blood flow therethrough being substantially vertically down therethrough.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a perspective view of the filter device and shows the general details thereof.

FIG. 2 is a horizontal sectional view taken along the line 2—2 of FIG. 1 and shows further details of the filter device.

FIG. 3 is a vertical sectional view taken generally along the line 3—3 of FIG. 1 and shows the internal construction of the filter device.

FIG. 4 is a fragmentary perspective view on an enlarged scale of a partially formed filter element for the filter device.

FIG. 5 is an enlarged fragmentary sectional view taken through the spiral wound filter element and shows more specifically the constructional details thereof.

FIG. 6 is a perspective similar to FIG. 4 showing a modified form of filter element.

FIG. 7 is an enlarged sectional view similar to FIG. 5 taken through the modified filter element.

FIG. 8 is a fragmentary perspective view of another form of filter device and shows generally the constructional details thereof.

FIG. 9 is a fragmentary transverse sectional view taken generally along the line 9—9 of FIG. 8 and shows further the details of the filter.

FIG. 10 is a fragmentary exploded perspective view showing the constructional details of the filter element of the filter device of FIG. 8.

Referring now to the drawings in detail, it will be seen that the filter device of FIGS. 1 - 3 is generally identified by the numeral 20 and includes a housing generally identified by the numeral 21. While the housing 21 may vary in construction in accordance with this invention, the housing 21 basically includes a lower housing half 22 and an upper housing half 23, which housing halves are readily separable but are sealed together against leakage therebetween. For example, the housing halves 22 and 23 may be provided with cooperating flanges 24 which may interlock and be sealed together in any suitable manner, as is best shown in FIG. 3.

The upper housing half 23 is provided with a supply fitting 25 which is generally horizontally disposed and offset from the center of the housing 20 so as to effect a generally spiral flow of blood entering into the upper housing half 13 through the supply fitting 17. This is best shown in FIG. 2.

The upper housing half 23 is also provided with a vent fitting 25 at the extreme upper end thereof. The vent fitting 25, by being disposed at the uppermost position of the housing 21, will provide a maximum path for removed gases or bubbles so as to minimize the outflow of liquid therewith, but at the same time will assure the proper venting of the housing 21 during a degassing operation.

The housing 21 further includes a drain fitting 26 which is at the extreme bottom of the bottom half 22 of the housing. The drain fitting 26, as is clearly shown in FIG. 3, is in a position to immediately drain blood treated within the filter device 20 so that the flow of blood through the device 20 may be continuous without storage of blood therein.

Referring once again to FIG. 3, it will be seen that the bottom housing half 22 is configurated so as to define an upwardly facing annular shoulder 27. Seated on this shoulder is a relatively coarse screen which may be formed of any suitable material including stainless steel.

Above the screen 28 is a final filter element 30 which is in the form of a fine monofilament fluff of DACRON or like material.

The lower housing half 22 includes a second and upper shoulder 31 on which a second screen 32 is seated. The screen 32 serves to retain the monofilament fluff 30 in place. Seated on the screen 32 is a primary filter element 33. Preferably the filter element 33 has overlying the same a further screen 39 which has a peripheral edge thereof entrapped between the flanges 24.

Reference is now made to FIGS. 4 and 5 wherein the constructional details of the filter element 33 are illustrated. In the construction thereof, at least two elongated strips 34 and 35 are provided. The strip 34 would be in the form of a fine filter cloth while the strip 35 may be in the form of a silicone rubber sheet although it too could be in the form of a fine mesh material. The filter cloth would preferably be of a mesh on the order of 400 filaments per inch and may be formed of NYLON or polyester.

Assembled with the strips 34 and 35 are two strips 36 and 37 which are formed of a coarse mesh support material such as VEXAR or other suitable plastic material.

The strips 34, 36 and 37 are assembled by monitoring the upper edges of the strips 34 and 36 together utilizing a silicone adhesive cement as at 38. The lower edges of the strips 34, 37 and 35 are secured together in a like manner as at 40. The bonded together strips are then spirally wound about a center core plug 41 with the upper edge of the strip 35 being secured by way of silicone adhesive cement 42 to the upper edge of the adjacent strip 36, as is shown in FIG. 5.

Referring now to FIG. 6, it will be seen that there is illustrated a modified form of filter element which is generally identified by the numeral 44. The filter element 44 is also in the form of a spirally wound element about a center plug 45 with the spirally wound element being formed of an elongated strip of filter cloth 46, which may be of the same construction as the filter cloth 34. The filter cloth 46, however, is longitudinally folded as at 47 to define two filter cloth layers. Between the filter cloth layers there is a folded strip 48 formed of coarse mesh material such as the material of strips 36 and 37, which is provided with its fold 49 disposed adjacent the fold 47. Within the lower portion of the coarse mesh material 48 is a narrow strip of coarse mesh material 50. The internested layers are secured together by suitable stitching 52. In addition there is a further strip of coarse mesh material 53 which is terminated above the strip 50, as is best shown in FIG. 7, so as to provide for an offsetting of one layer of the filter cloth material 46. As these assembled strips are spirally wound around the center plug 45, they are adhesively bonded together as at 54 to form a sealed unit requiring the blood being filtered to pass through the layers of the filter cloth 46.

It is to be understood that the filter element 44 will be assembled within the housing 21 in the same manner as that described above with respect to the filter element 33.

Operation

In the embodiment of FIGS. 1 – 7, blood enters the housing 21 through the inlet fitting 24 and moves in a generally spiral path in the open upper half 23. As it flows around the top half of the housing 21 in an unrestricted manner, gas, air and oxygen bubbles will be released therefrom and these bubbles will flow upwardly and out through the outlet 25.

The blood will move around over the screen 39 and pass therethrough down through the filter element 33. Due to the construction of the filter element 33, it is forced to pass through the filter cloth layer 34 as it becomes trapped between adjacent filter cloth layers 34 and silicone sheets 35. It is to be understood that the filter element 33 will have sufficient rigidity due to the coarse mesh layers 36, 37 so as to support the very fine filter cloth layer 34 against collapse.

The filter element 33 will remove from the blood particulate matter and silicone oil. After the initially filtered blood passes through the filter element 33, it passes into the final filter 30 and a further and finer filtration takes place.

When the filter device 20 is provided with a filter element 44 of FIGS. 6 and 7, the operation of the filter device will be substantially the same except that in lieu of alternating layers of silicone sheets, all of the layers other than the coarse mesh support, are in the form of filter cloth and the filtering action will be substantially the same as that of the filter element 33 except that there is twice the filtering surface, but no silicone sheet material to absorb silicone oil.

Reference is now made to FIGS. 8, 9 and 10 wherein a further filter construction is illustrated. The filter device illustrated therein is generally identified by the numeral 60 and includes a base member 61 and an inverted channel member 62 having closed ends. It is to be understood that the channel member 62 is suitably sealed relative to the base 61 and is provided with an inlet 63 while the base 61 is provided with an outlet 64. Disposed within the space defined by the channel member 62 and the base 61 is a filter element, generally identified by the numeral 65. The filter element is formed of an elongated strip of filter cloth 66 of a width corresponding to the length of the channel member 62. The filter cloth 66 is reversely folded upon itself to define a plurality of pleats.

Within each of the pleats of the filter cloth 66 there is a support 67 in the form of a coarse mesh which is folded upon itself. Each support 67 has the fold thereof interenested within a corresponding fold in the filter cloth 66.

After the filter element 65 has been formed, the ends thereof are potted and the same is mounted within the channel member 62 in sealed relation.

It will be readily apparent that the constructions of the several filter elements disclosed herein are such that very fine filter cloth may be utilized. That is a filter cloth which does not have sufficient strength to be self-supporting. However, by disposing the filter cloth generally vertically and reinforcing the same by the coarse mesh material, it will be seen that the filter element will be self-supporting and a very high degree of filtration may be effected with a minimum resistance to flow therethrough.

Although only several forms of the filter construction have been specifically illustrated and described herein, it is to be understood that minor variations may be made in the filter construction without departing from the spirit and scope of the invention, as defined by the appended claims.

I claim:

1. A filter for blood and like liquids, said filter having a path of liquid flow and including a filter element formed of a plurality of first and second layers of which said first layers are each formed of fine filter cloth disposed generally parallel to said liquid flow path for the gradual filtered flow of liquid therethrough, each of said second layers being in the form of a silicon sheet for both directing blood through said filter cloth layers and picking up silicon oil by absorption, and a coarse support mesh disposed between adjacent first and second layers and secured thereto to reinforce said first and second layers and support the same.

2. The filter of claim 1 wherein said filter cloth is of the 400 filament per inch type.

3. The filter of claim 1 wherein each of said first and second layers has remote edges in the direction of liquid flow secured to a like edge of a single adjacent one of said first and second layers with said first and second layers being arranged in zig-zag relation thereby requiring all liquid passing through said filter to flow through said cloth filter layers.

4. The filter of claim 3 wherein said first and second layers and said coarse support mesh layers are elongated strips and are spirally wound.

5. The filter of claim 4 wherein said filter includes a housing supporting said filter element, said housing having an upper portion in the form of a debubbler and including means for effecting the spiral flow of liquid above said filter element.

6. The filter of claim 1 wherein each support mesh layer has one edge thereof in the direction of liquid flow positioned between sealed together edge portions of adjacent ones of said first and second layers, and the opposite edge of each support mesh layer being free.

7. The filter of claim 6 wherein each of said first and second layers is separately formed in the form of an elongated strip.

8. A filter for blood and like liquids, said filter having a path of liquid flow and including a filter element formed of first and second layers of which at least one layer is formed of fine filter cloth disposed generally parallel to said liquid flow path for the gradual filtered flow of liquid therethrough, and a coarse support mesh disposed between adjacent first and second layers and secured thereto to reinforce said first and second layers and support the same, said first and second layers being both filter cloth layers arranged in upstanding integral pairs joined by an uppermost fold, and a further narrow support mesh layer is disposed between lower edge portions of each integral pair of filter cloth layers, and the support mesh layers disposed between adjacent pairs of integrally connected filter cloth layers being accordingly foreshortened.

9. The filter of claim 8 wherein each support mesh layer disposed between filter cloth layers of an integrally connected pair is of a folded construction with an uppermost fold and said narrow support mesh layer being within said folded support mesh layer.

10. The filter of claim 8 wherein each pair of filter cloth layers and the support mesh layers incorporated therein are interconnected by stitching.

11. The filter of claim 8 wherein each pair of filter cloth layers and the support mesh layers incorporated therein are interconnected by stitching, spirally wound, and lower edges of adjacent filter cloth panel pairs being adhesively bonded together.

12. A filter for blood and like liquids, said filter having a path of liquid flow and including a filter element formed of first and second layers of which at least one layer is formed of fine filter cloth disposed generally parallel to said liquid flow path for the gradual filtered flow of liquid therethrough, and a coarse support mesh disposed between adjacent first and second layers and secured thereto to reinforce said first and second layers and support the same, said first and second layers being both filter cloth layers disposed generally upstanding and integrally connected by folds and are continuous, said filter cloth folds and said support mesh folds being internested, and adjacent folded support mesh layers facing and opening in opposite directions.

* * * * *